(12) United States Patent
Sahai et al.

(10) Patent No.: US 12,357,003 B2
(45) Date of Patent: *Jul. 15, 2025

(54) SOLUBLE INSTANT COFFEE AND PROCESS FOR PREPARATION

(71) Applicant: SOCIETE DES PRODUITS NESTLE S.A., Vevey (CH)

(72) Inventors: Deepak Sahai, Plain City, OH (US); Amrit Maharaj, Dublin, OH (US); Rachid Rahmani, Marysville, OH (US); Marc Raederer, Le Mont-sur-Lausanne (CH); Stefan Palzer, Lausanne (CH); Hervé Crosnier, Savigny (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,250

(22) Filed: Mar. 20, 2024

(65) Prior Publication Data

US 2024/0225032 A1   Jul. 11, 2024

Related U.S. Application Data

(60) Continuation of application No. 17/740,917, filed on May 10, 2022, now Pat. No. 11,974,584, which is a
(Continued)

(51) Int. Cl.
A23F 5/30 (2006.01)
A23F 5/18 (2006.01)
(Continued)

(52) U.S. Cl.
CPC ............... *A23F 5/185* (2013.01); *A23F 5/18* (2013.01); *A23F 5/26* (2013.01); *A23F 5/30* (2013.01); *A23F 5/34* (2013.01); *A23F 5/36* (2013.01)

(58) Field of Classification Search
CPC ..... A23L 3/46; A23L 2/76; A23L 3/44; A23V 2250/214; A23F 3/163; A23F 3/14;
(Continued)

(56) References Cited

U.S. PATENT DOCUMENTS 2,340,758 A    5/1942   Kappenberg
7,419,692 B1   9/2008   Kalenian
(Continued)

FOREIGN PATENT DOCUMENTS

EP    0554008    8/1993
EP    1745702    1/2007
(Continued)

OTHER PUBLICATIONS

JP 09004080 A, Abstract machine translation (Year: 1997).

*Primary Examiner* — Hong T Yoo
(74) *Attorney, Agent, or Firm* — K&L Gates LLP

(57) ABSTRACT

The present invention relates to a dried coffee powder obtainable by a process comprising membrane filtration of a low temperature extract of roasted and ground coffee beans to reduce the concentration of low molecular weight components and drying the filtered coffee extract.

20 Claims, 2 Drawing Sheets

Related U.S. Application Data division of application No. 15/775,540, filed as application No. PCT/EP2016/076121 on Oct. 28, 2016, now Pat. No. 11,350,645.

(60) Provisional application No. 62/255,202, filed on Nov. 13, 2015.

(51) Int. Cl.
  *A23F 5/26* (2006.01)
  *A23F 5/34* (2006.01)
  *A23F 5/36* (2006.01)

(58) Field of Classification Search
  CPC ...... A23F 3/18; A23F 3/34; A23F 3/16; A23F 3/30; A23F 3/26; A23F 3/32; A23F 3/22; A23F 3/20; A23F 3/00; A23F 3/24; A23F 5/02; A23F 5/30; A23F 5/32
  See application file for complete search history.

(56) References Cited

U.S. PATENT DOCUMENTS

| | | | |
|---|---|---|---|
| 10,004,249 B2 | 6/2018 | Castro et al. | |
| 11,266,160 B2* | 3/2022 | Sahai | A23F 5/14 |
| 11,350,645 B2* | 6/2022 | Sahai | A23F 5/18 |
| 11,700,863 B2* | 7/2023 | Glancy | A23F 3/24 |
| | | | 426/492 |
| 11,974,584 B2* | 5/2024 | Sahai | A23F 5/26 |
| 2011/0104361 A1 | 5/2011 | Miyazawa et al. | |
| 2019/0142026 A1 | 5/2019 | Sahai | |

FOREIGN PATENT DOCUMENTS

| | | |
|---|---|---|
| EP | 2666363 | 11/2013 |
| JP | 09094080 | 8/1997 |
| WO | 9952378 | 10/1999 |
| WO | 0069274 | 11/2000 |
| WO | 0130173 | 5/2001 |

\* cited by examiner

SOLUBLE INSTANT COFFEE AND PROCESS FOR PREPARATION

CROSS REFERENCE TO RELATED APPLICATIONS

The present application is a continuation of U.S. patent application Ser. No. 17/740,917 filed May 10, 2022, which is a divisional of U.S. patent application Ser. No. 15/775,540 filed May 11, 2018, now U.S. Pat. No. 11,350,645 issued Jun. 7, 2022, which is a National Stage of International Application No. PCT/EP2016/076121 filed Oct. 28, 2016, which claims priority to U.S. Provisional Patent Application No. 62/255,202 filed Nov. 13, 2015, the entire contents of which are incorporated herein by reference.

FIELD OF INVENTION

The present invention relates to soluble instant coffee and processes for its preparation. In particular, the invention relates to dried coffee powders with improved properties of flavour and stability. Such a powder may provide instant coffee powder or may be used by itself or in compositions combined with roast and ground and/or micronized coffee to manufacture capsules for beverage dispensing systems.

BACKGROUND

Instant coffee is soluble coffee powder that can be dissolved in water to provide a fast and convenient way for consumers to prepare coffee.

Coffee is typically prepared by brewing roasted and ground coffee beans in hot water. The flavour characteristics of the coffee are influenced by many factors, including the roasting conditions, the size of the ground particles, and the time in which the coffee grounds are in contact with the hot water during brewing.

Instant coffee can be produced by drying such a brew to form a powder; a typical drying method is freeze drying.

While instant coffee is valued by consumers for its convenience, it is known that such soluble coffee powders often have flavour characteristics that are different to those of freshly brewed coffee. Instant coffee is usually perceived as being less fresh by consumers who like fresh brewed coffee.

As consumers show increasing preference for freshly-brewed or even cold-brewed coffees, there is considerable commercial interest in the development of instant coffees that have improved flavour characteristics that more closely replicate the experience of drinking premium freshly brewed coffees, but which can advantageously be marketed as stable dried coffee powder in the existing format of a coffee jar. Such improved instant coffees would enable the targeting of consumers who prefer the taste of ultra-high quality fresh brewed or cold brewed coffee but like the convenience of instant coffee.

Due to the chemistry of freshly brewed, premium coffee, it is very difficult to dry it and make a sufficiently stable powder. A freeze dried powder prepared from a premium coffee brew can be highly hygroscopic (it attracts and absorbs water) with a tendency to form a "cake" or collapse in the jar.

A number of approaches have been used to try to address this problem.

During conventional soluble coffee manufacturing, the extraction is done in two steps, the first extract is produced at or about boiling water temperatures and has flavour characteristics that are brew-like. The second extract from the pre-extracted grounds is produced at higher temperatures approximately 160° C.-204° C. and has strong bitter and "processed" flavour characters.

However, while the first extract has desirable characteristics, it is difficult to make a stable freeze dried coffee powder using this extract only because of its deficiency in high molecular weight compounds. Therefore to make an instant coffee powder that has good stability, both extracts are combined, thereby sacrificing some positive sensory attributes.

An alternative approach to making a stable instant coffee powder using only the first extract is to add bulking agents such as maltodextrins. However, with this method the coffee powder produced is no longer "100% coffee" and cannot be labelled as such.

There is therefore a need in the art for improved soluble instant coffee powders and processes for their production, that do not suffer from the above-described drawbacks.

SUMMARY

The present invention addresses the above prior art problems (freshness and stability) by providing soluble instant coffee and processes for its preparation, as specified in the claims.

In one aspect, the invention provides a dried coffee powder obtainable by a process comprising membrane filtration of a first extract of roasted and ground coffee beans to enhance the concentration of high molecular weight components and drying the filtered coffee extract.

In one embodiment, the process by which the dried coffee powder is obtainable comprises the steps of: (i) extracting coffee solids from roasted and ground coffee beans using water at a temperature of between 0 and 110° C. or 0 and 140° C. to obtain a first coffee extract; (ii) filtering the first coffee extract using a selectively-permeable membrane to enhance the concentration of high molecular weight components (reduce the concentration of low molecular weight components), wherein low molecular weight coffee solids that pass through the filter form a permeate and high molecular weight coffee solids that are retained by the filter form a retentate; and (iii) drying the retentate to form a dried coffee powder.

In one embodiment, the water is at a temperature of between 0 and 100° C. (e.g. between 20 and 50° C., between 10 and 40° C., between 20 and 40° C., or between 20 and 30° C.).

In one embodiment, the water is at a temperature of about 0, 10, about 15, about 20, about 25, about 30, about 35, about 40, about 45, 50, 60, 70, 80, 90, 100, 110, 140° C.

In one embodiment, the coffee extract is passed through a membrane that has a molecular weight cut off of 0.1-100 kDa. The membrane can be of organic or inorganic material.

In one embodiment, the dried coffee powder comprises a ratio of coffee compounds where the concentration of high molecular weight compounds to the concentration of low molecular weight compounds (as defined by the size exclusion chromatography technique) is at least 5.

In one embodiment, the process by which the filtered coffee extract is obtainable comprises the steps of: (i) extracting coffee solids from roasted and ground coffee beans using water at a temperature of between 0 and 110° C. or 0 and 140° C. to obtain a first coffee extract; and (ii) filtering the first coffee extract using a selectively-permeable membrane to reduce the concentration of low molecular weight components, wherein water and some of the low molecular weight coffee solids pass through the filter form a permeate. The retained coffee fraction (retentate) can be used as a beverage, further concentrated to make a syrup or concentrated and subsequently dried to make a shelf stable powder.

In one aspect, the invention provides a process for preparing a dried coffee powder, said process comprising membrane filtration of a low temperature extract of roasted and ground coffee beans to reduce the concentration of low molecular weight components and drying the filtered coffee extract.

In one embodiment, said process comprises the steps of: (i) extracting coffee solids from roasted and ground coffee beans using water at a temperature of between 0 and 110° C. or 0 and 140° C. to obtain a first coffee extract; (ii) filtering the first coffee extract using a selectively-permeable membrane to reduce the concentration of low molecular weight components and provide a filtered coffee extract; and (iii) drying the filtered coffee extract to form a dried coffee powder.

In one embodiment the low molecular weight components have a molecular weight less than about 1 kDa.

In one embodiment, the low molecular weight coffee solids that pass through the filter form a permeate. The coffee solids that are retained by the filter form a retentate. The product is made from the retentate.

In one embodiment, the the filtered coffee extract comprises coffee compounds where the ratio of the concentration of high molecular weight compounds to the concentration of low molecular weight compounds (as defined by the size exclusion chromatography technique) is at least 5

In one embodiment, the membrane is selectively permeable and has a molecular weight cut off of 0.1-100 kDa.

In one embodiment, the filtered coffee extract is concentrated prior to drying, for example by reverse osmosis or low temperature vacuum evaporation.

In one embodiment, the filtered coffee extract is dried using freeze drying or spray drying.

In one embodiment, coffee aroma is recovered prior to filtration and is subsequently blended with the filtered coffee extract prior to drying.

In one aspect, the invention provides a dried coffee extract obtainable by a process as described above.

In another aspect, the invention relates to a capsule used in a coffee dispensing system, wherein the capsule comprises a mixture of roast and ground coffee and dried coffee extract as described above.

DETAILED DESCRIPTION

Figure 1:
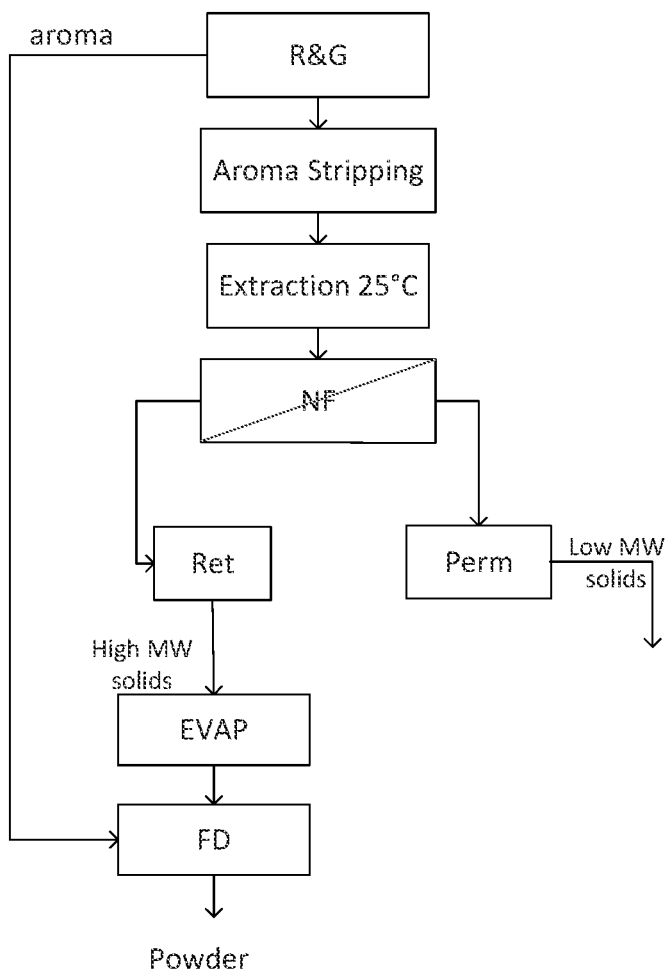
FIG. 1 presents a flow-chart showing an example process according to the invention.
Figure 2:
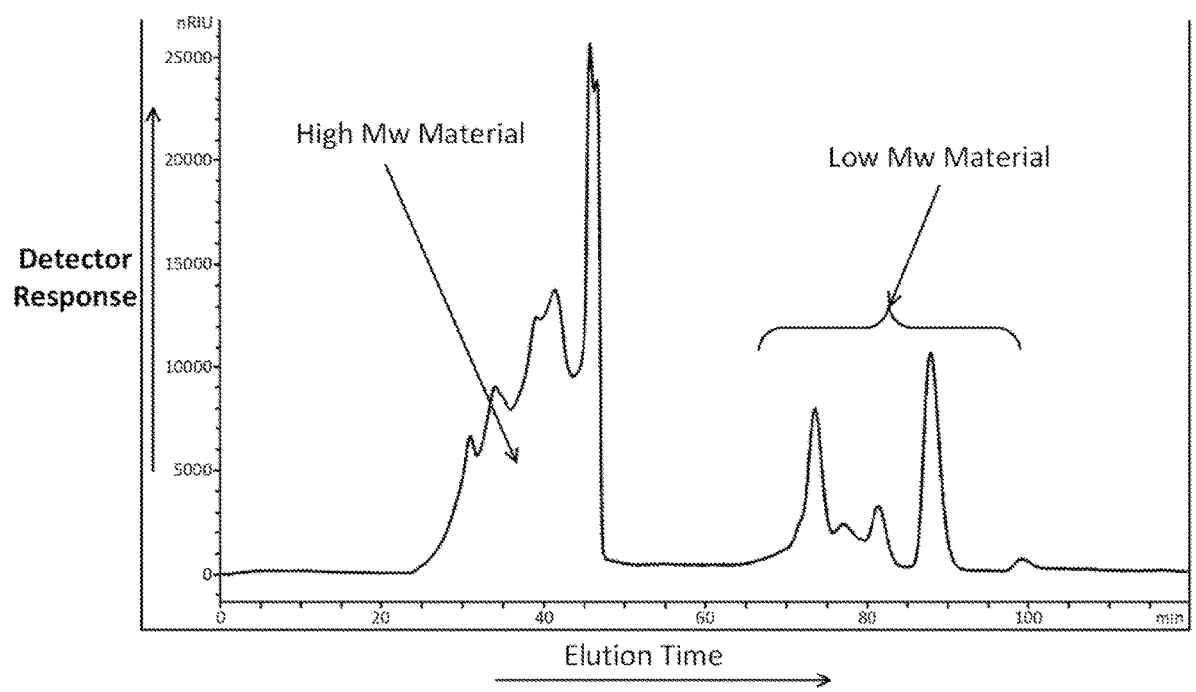
FIG. 2 presents an SEC chromatogram of a coffee extract produced using water at a temperature of 25° C.

The present invention provides a dried coffee powder obtainable by a process comprising membrane filtration of a low temperature extract of roasted and ground coffee beans to reduce the concentration of low molecular weight components and drying the filtered coffee extract.

The present inventors have discovered that a dried coffee powder suitable for use as an instant coffee and having highly desirable flavour characteristics of brewed coffee can be prepared by using membrane filtration to reduce the concentration of low molecular weight (LMW) components in a brewed coffee extract prior to a drying process. The dried coffee powder produced has good stability characteristics and low hygroscopicity, thus enabling it to be stored for long periods of time and making it suitable for use as an instant coffee.

The process of membrane filtration reduces the concentration of LMW components and provides a concomitant increase in the ratio of high molecular weight (HMW) components to LMW components in the filtered coffee extract.

By using membrane filtration to reduce the concentration of low molecular weight components in the brewed coffee extract, a stable instant coffee powder.

Extraction is the process by which coffee solids (e.g. soluble coffee solids) are extracted from roasted and ground coffee beans, typically using water, to form a solution referred to as a coffee extract.

The process of the invention is carried out using a low temperature extract of roasted and ground coffee beans. As used herein, the term "low temperature extract" is preferably a coffee extract obtained using water at a temperature of between 0 and 110° C. or 0 and 140° C.

The process of the invention uses membrane filtration to reduce the concentration of low molecular weight components of the coffee extract. Thus, the coffee extract is passed over a membrane which is selectively permeable to LMW components of the coffee extract, allowing these to be separated and thus reducing their concentration in the coffee extract. By reducing the concentration of LMW components, there is a concomitant increase in the ratio of HMW to LMW components.

In a preferred embodiment, the term "low molecular weight component" refers to compounds present in a coffee extract (coffee solids) that have a molecular weight of less than about 1 kDa (for example, less than about 0.9, 0.8, 0.7, 0.6 or 0.5 kDa), and the term "high molecular weight component" refers to compounds present in a coffee extract (coffee solids) that have a molecular weight greater than about 1 kDa (for example, greater than about 1.1, 1.2, 1.3, 1.4 or 1.5 kDa).

The present inventors have discovered that a dried coffee powder having particularly advantageous properties (such as advantageous stability properties) is produced when the ratio of HMW to LMW components (as defined by the size exclusion chromatography technique) is at least 5 (for example, at least 5, at least 5.5, at least 6, at least 6.5, or at least 7).

The present invention provides a process for preparing a dried coffee powder, said process comprising membrane filtration of a low temperature extract of roasted and ground coffee beans to reduce the concentration of low molecular weight components and drying the filtered coffee extract.

In a preferred embodiment, the process comprises the steps of: (i) extracting coffee solids from roasted and ground coffee beans using water, preferably at a temperature of between 0 and 110° C. or 0 and 140° C., to obtain a first coffee extract; (ii) filtering the first coffee extract using a selectively-permeable membrane to reduce the concentration of low molecular weight components, wherein low molecular weight coffee solids that pass through the filter form a permeate. The high molecular weight coffee solids that are retained by the filter form a retentate; and (iii) drying the retentate to form a dried coffee powder.

The process of the present invention comprises a low temperature extraction using water, preferably at a temperature of between 0 and 110° C. or 0 and 140° C., to obtain a first coffee extract.

In one embodiment, the water is at a temperature of between 0 and 110° C. or 0 and 140° C. (for example, between 20 and 50° C., between 10 and 40° C., between 20 and 40° C., or between 20 and 30° C.). In one embodiment, the water is at a temperature of about 10, about 15, about 20, about 25, about 30, about 35, about 40, about 45, or about 50° C.

The roasted coffee beans are ground prior to extraction. Any suitable beans may be used. Methods for roasting and grinding coffee beans to obtain desired characteristics are well known in the art.

The extraction may be carried out in any suitable extraction vessel, for example fixed bed reactors or continuous counter-current extractors.

The extraction yield of a coffee extract refers to the percentage of coffee solids that are transferred (i.e. extracted) to the water during the extraction step. The extraction yield can be controlled using extraction water temperature and the ratio of water to beans. The inventors have found that coffee extracts produced with a low yield provide particular advantageous flavour characteristics when used in the process of the invention.

Following the extraction, a "first coffee extract" is obtained. The first coffee extract is filtered using a membrane, which enables a reduction in the concentration of LMW components (for example, components have a molecular weight less than about 1 kDa). The membrane is selectively permeable with a molecular weight cut-off value that allows only LMW components to pass through the membrane. In one embodiment, the membrane has a molecular weight cut-off of 1 kDa, meaning that compounds having a molecular weight of greater than about 1 kDa are retained by the membrane.

Thus, coffee solids having a molecular weight less than the molecular weight cut-off value of the membrane (i.e. LMW components of the coffee extract) are able to pass through the filter while coffee solids having a molecular weight greater than the molecular weight cut-off value of the membrane (i.e. HMW components of the coffee extract) are unable to pass through the filter and are therefore retained in the coffee extract. Filtration using such a selectively-permeable membrane therefore separates the coffee extract into two different fractions: the LMW fraction that passes through the filter is referred to as the permeate, while the HMW fraction that is retained by the filter is referred to as the retentate.

The permeate may be alternatively recycled for use in a separate coffee product.

In one embodiment, the filtered coffee extract comprises a ratio of HMW components to LMW components of at least 5. In another embodiment the obtained filtered coffee extract may be combined with roast and ground or micronized coffee solids to prepare a composition suitable for a capsule to be used in a coffee dispensing system. The amount of filtered coffee extract of the invention in a mix with R&G coffee may range from 5 to 95% W/W. In one embodiment the ratio of R&G and filtered coffee of invention may be 4:1 and 7:0.7.

As discussed above, the present inventors have discovered that a dried coffee powder having particularly advantageous properties (such as stability properties) is produced when the concentration ratio of HMW components (for example, those having a molecular weight greater than about 1 kDa) to the concentration of LMW components (for example, those having a molecular weight less than about 1 kDa) is at least 5 (e.g. at least 5, at least 5.5, at least 6, at least 6.5, or at least 7).

To improve the efficiency of the filtration process, the retentate may be recycled and subjected to the filtration process multiple times.

The filtration step may be carried out using cross-flow filtration, in which the fluid flow is tangential to the surface of the membrane, or using "dead end" filtration, where the fluid flow is perpendicular to the membrane or any other membrane fractination technique.

Membranes suitable for use in the process of the invention include nanofiltration membranes having a molecular weight cut-off of 0.1-100 kDa.

Specifications of an example suitable membrane are as follows:

TABLE 1

An example of membrane properties

| Parameter | Specification |
|---|---|
| sucrose rejection at 70-145 psi | 45-75% |
| NaCl rejection at 70-145 psi | 50-60% |
| Operating pH range | 2-11 |
| Cleaning pH range | 1-12 |
| Maximum cleaning temperature | 50° C. |
| Typical operating temperature | 5-50° C. |
| Maximum chlorine concentration | <100 ppm |

Suitable membrane sizes will vary depending on the scale of the production process.

A diafiltration step may be carried out in combination with the filtration step. A diafiltration step consists of adding dilution water to the retentate product then removing a permeate fraction equivalent to the amount of added dilution water.

Following the filtration step, the retentate (i.e. the filtered coffee extract) is dried to form a soluble coffee powder.

Suitable processes for drying a coffee extract to produce a soluble coffee powder (an instant coffee) are known in the art and include freeze drying and spray drying. Thus, in one embodiment, the filtered coffee extract is freeze dried to form a dried coffee powder. In one embodiment, the filtered coffee extract is spray dried to form a dried coffee powder.

In a freeze drying process, a liquid coffee extract is frozen at about −20° C. to about −40° C., before being heated under low pressure conditions. Application of low pressures enables the frozen water component to be removed (such as by sublimation) without needing high temperatures, which could degrade the flavour and other characteristics of the coffee extract.

Spray drying is an alternative to freeze drying. In spray drying, a liquid coffee extract is sprayed through a small nozzle into a heated drying gas. This produces dried coffee particles which can subsequently be collected.

The process of the invention may comprise an additional concentration step prior to the drying step. Such a concentration step can be used to increase the strength of the coffee extract and improve the flavour characteristics. Thus, in one embodiment, the filtered coffee extract (the retentate) is concentrated prior to drying, optionally by reverse osmosis or low temperature vacuum evaporation, freeze concentration, or any other technique known in the art.

The aroma of coffee comes from multiple different chemical compounds which make up the aroma components. Coffee aroma is an important quality which can influence the taste and perception of coffee by consumers. If a coffee product lacks the aroma commonly associated with it, consumer perception of the coffee may be adversely affected. This can be a problem in the field of instant coffee, where processes of extraction, concentration and drying may reduce or remove the coffee aroma. For these reasons, it may be advantageous to recover coffee aromas which are given off during the processing of the coffee and to reintroduce these aromas to the coffee extract prior to drying.

Thus, in one embodiment, coffee aroma is extracted from the roasted and ground coffee beans prior to the extraction of the coffee solids, and said coffee aroma is subsequently blended with the filtered coffee extract prior to drying.

Processes for extracting coffee aromas and subsequently reintroducing them to coffee extracts prior to drying are known in the art. An example of a suitable process is vacuum extraction (VAX). Processes for recovering coffee aromas are described in WO 1999/052378 and WO 2001/013735.

The dried coffee powder of the invention has good stability properties, making it suitable for use as an instant coffee. Instant coffee is typically packaged and sold in jars, which are stored at room temperature for long periods of time. Thus, in one embodiment, the dried coffee powder of the invention is advantageously stable at room temperature for at least six months.

Those skilled in the art will understand that they can freely combine all features of the present invention described herein without departing from the scope of the invention as disclosed.

EXAMPLES

Various preferred features and embodiments of the present invention will now be described by way of non-limiting examples.

Example 1: Preparation of a Dried Coffee Powder

An example flow-chart is shown in FIG. 1.

Coffee beans were roasted and ground. Coffee aroma was extracted from the roasted and ground beans using a vacuum extraction process; the coffee aroma was stored for later reintroduction into the process.

The aroma-extracted roasted grounds were introduced into an extractor and the coffee solids extracted using water at a temperature of 25° C. using water to coffee ratio of 4.0.

The above obtained coffee extract then underwent a nanofiltration process using a semi-permeable membrane with a molecular weight cut-off of 1 kDa. Low molecular weight components were filtered into permeate, while high molecular weight components remained in the retentate.

The filtered coffee extract in the form of the retentate comprised the concentration of HMW and the concentration of LMW components at a ratio of approximately 5 (HMW to LMW, as defined by the SEC technique).

The filtered coffee extract was freeze dried to produce a stable dried coffee powder.

Example 2: Preparation Using Different Membranes

Various polymeric ultrafiltration (UF) and nanofiltration (NF) membranes with molecular weight cut offs (MWCO) ranging between 500 and 20,000 Da were used to fractionate cold brew coffee extract during a series of preliminary bench scale screening experiments. The fractionations were conducted on a plate-and-frame unit equipped with 84 cm2 of membrane area and operated at temperatures between 10-60° C. and pressures up to 30 bars.

The results from the initial screening tests identified NF membrane (molecular weight cut-off of 1 kDa) as a particularly suitable membrane for the fractionation of low temperature coffee extract. The selection of the membrane was based on its performance in terms of permeation flux, cleanability and its ability to fractionate and separate enough of the low molecular weight coffee compounds in the permeate so that the obtained retentate can be used to make a dryable product with superior sensory qualities.

Example 3: Preparation of Prototype Dried Coffee Powders

Extraction trials were conducted using pilot plant scale extraction. To evaluate the impact of temperature on the extracts, three trials were done to produce coffee extracts at temperatures of 25°, 50° and 85° C.

The resulting extract was fractionated using a 2-module co-pilot scale nanofiltration system (11 m2 membrane area) operated in the batch mode at ambient temperature. A concentration factor (CF) of 4.0 was achieved during initial fractionation. The retentate was further subjected to diafiltration to wash out more of the low molecular weight compounds from the retentate. The diafiltration step consisted of adding dilution water to the retentate product then removing a permeate fraction equivalent to the amount of added dilution water.

The results of the membrane performance in terms of permeation flux, solids recovery are summarized in Table 2.

TABLE 2

Membrane performance for producing coffee extract fractions
Permeation flux performance during nanofiltration of pre-E1 extracts

| | | Single cell pilot plant extraction Trial # | | | |
|---|---|---|---|---|---|
| | Processing conditions | Trial 1 | Trial 2 | Trial 3 | Trial 4 |
| Extraction | Temp. ° C. | 85 | 50 | 25 | 25 |
| | Total Solids | 4.51 | 3.9 | 2.41 | 2.1 |
| Nanofiltration | Applied pressure (bar) | 17-30 | 8 to 26 | 10 to 20 | 10 to 18 |
| | Avg Flux, L/m2 · h | 6.1 | 7.8 | 8.3 | 8.2 |
| | Avg. diaf. Flux | 6.8 | 6.8 | 7.3 | 7.5 |

Aroma was added to the diafiltered retentate to make the aromatized freeze-dried powders.

Example 4: Size-Exclusion Chromatography Analysis

Size-exclusion chromatography was used to analyse filtered coffee extracts produced using the process of the invention.

Coffee extract was separated using two size exclusion columns (Superose 60 and Superdex Peptide from GE Healthcare) connected in series in an HPLC (high performance liquid chromatography). Water was used as the mobile phase at a flow rate of 0.5 ml/minute. The peaks were visualized using a refractive index detector. The run time for the chromatogram was 120 minutes.

It was possible to visualize the compounds forming the coffee extract. The SEC chromatogram showed two distinct peak clusters (FIG. 3). The material eluting before 60 minutes comprised high molecular weight compounds, while the peak cluster eluting after 60 minutes was low molecular weight compounds.

The peak area under the two peak clusters was determined. The ratio of the peak areas for the high molecular weight (HMW) materials peaks and the low molecular weight (LMW) material peaks was calculated.

A coffee extract produced for use in the process of the invention (25° C.) was analyzed using this technique. The SEC chromatogram was as shown in FIG. 3. The high molecular weight peak cluster and the low molecular weight peak clusters were visualized and the ratio of the high molecular weight compounds to low molecular weight compounds was calculated to be 5.0

The retentate produced using membrane with diafiltration, was further freeze dried into a dried coffee powder. The filtered extract formed a relatively stable powder when compared with the powder produced from the extract without to membrane filtration.

Example 5: Preparation of Coffee Capsules and Beverage Using a Coffee Machine

In another example, the dried coffee powder prepared as in example 1 can be filled into capsules used in coffee machines. A high quality coffee beverage could be prepared using the capsule containing 4 grams of the dried coffee powder at ambient temperature.

Example 6

In another example, the dried coffee powder prepared as in example 1 (1 gram) could be blended with roast & ground coffee (4 grams) and the mixture filled in coffee capsules for use with coffee machines. A high quality coffee beverage with high level of coffee aroma release could be prepared at ambient temperature when using the capsule in the coffee machines. Below table 3 shows sensory profile measured. The number indicates intensity value within a group of high/medium level.

TABLE 3

|  | Control (r&G Coffee 4 g) | Powder of example 5 | Powder of example 6 |
|---|---|---|---|
| Overall Intensity | 4 - medium low | 5.5 medium | 7 high |
| Roasty | 4 medium low | 5.5 medium | 7 high |
| Fruity, coffee | 1.5 low | 3 low | 5 medium |
| Acid | 3 low | 5 medium | 6 medium high |
| Bitter | 4 medium low | 6 medium high | 7 high |
| Smooth | 9 very high | 7 high | 6 medium high |
| body | 4 medium low | 5.5 medium | 7 high |

The invention claimed is:

1. An instant coffee product, the instant coffee product comprising:
    a jar; and
    a dried coffee powder within the jar, the dried coffee powder obtained by a process comprising:
        extracting coffee solids from roasted and ground coffee beans using water at a temperature between 0 and 140° C. to obtain a first coffee extract;
        performing membrane filtration of the first coffee extract to reduce a concentration of low molecular weight components and obtain filtered coffee extract, the low molecular weight components having a molecular weight less than about 1 kDa; and
        drying the filtered coffee extract.

2. The instant coffee product of claim 1, wherein the performing of the membrane filtration comprises filtering the first coffee extract using a selectively-permeable membrane to reduce the concentration of the low molecular weight components, wherein the low molecular weight components comprise low molecular weight coffee solids that pass through the selectively-permeable membrane to form a permeate, and wherein high molecular weight coffee solids that are retained by the selectively-permeable membrane form a retentate; and
    wherein the drying of the filtered coffee extract comprises drying the retentate.

3. The instant coffee product of claim 2, wherein the selectively-permeable membrane is selectively permeable to the components having molecular weight less than 1 kDa in the first coffee extract.

4. The instant coffee product of claim 1, wherein the dried coffee powder comprises a ratio of a concentration of high molecular weight components to the concentration of low molecular weight components, as defined by size exclusion chromatography (SEC), of at least 5, the high molecular weight components having a molecular weight greater than about 1 kDa.

5. The instant coffee product of claim 1, wherein the process for obtaining the dried coffee powder further comprises:
    extracting coffee aroma from the roasted and ground coffee beans prior to the extracting of the coffee solids from the roasted and ground coffee beans; and
    subsequently blending the coffee aroma with the filtered coffee extract prior to the drying of the filtered coffee extract.

6. The instant coffee product of claim 1, wherein the process for obtaining the dried coffee power further comprises concentrating the filtered coffee extract prior to the drying of the filtered coffee extract.

7. A process for preparing an instant coffee product, the process comprising:
    extracting coffee solids from roasted and ground coffee beans using water at a temperature between 0 and 140° C. to obtain a first coffee extract;
    performing membrane filtration of the first coffee extract to reduce a concentration of low molecular weight components and obtain a filtered coffee extract, the low molecular weight components having a molecular weight less than about 1 kDa;
    drying the filtered coffee extract to form a dried coffee powder; and
    packaging the dried coffee powder in a jar, the instant coffee product comprising the jar and the dried coffee powder packaged in the jar.

8. The process of claim 7, wherein the performing of the membrane filtration comprises filtering the first coffee extract using a selectively-permeable membrane to reduce the concentration of the low molecular weight components, wherein the low molecular weight components comprise low molecular weight coffee solids that pass through the selectively-permeable membrane to form a permeate, and wherein high molecular weight coffee solids that are retained by the selectively-permeable membrane form a retentate; and
    wherein the drying of the filtered coffee extract comprises drying the retentate.

9. The process of claim 8, wherein the selectively-permeable membrane is selectively permeable to the components having molecular weight less than 1 kDa in the first coffee extract.

10. The process of claim 7, wherein the dried coffee powder comprises a ratio of a concentration of high molecular weight components to the concentration of low molecular weight components, as defined by size exclusion chromatography (SEC), of at least 5, the high molecular weight components having a molecular weight greater than about 1 kDa.

11. The process of claim 7, further comprising:
   extracting coffee aroma from the roasted and ground coffee beans prior to the extracting of the coffee solids from the roasted and ground coffee beans; and
   subsequently blending the coffee aroma with the filtered coffee extract prior to the drying of the filtered coffee extract.

12. The process of claim 7, further comprising concentrating the filtered coffee extract prior to the drying of the filtered coffee extract.

13. The process of claim 7, wherein the drying of the filtered coffee extract comprises freeze drying or spray drying.

14. The process of claim 7, further comprising providing the dried coffee powder in the jar to a consumer.

15. A process for preparing an instant coffee product, the process comprising:
   extracting coffee solids from roasted and ground coffee beans using water at a temperature between 0 and 140° C. to obtain a first coffee extract;
   performing membrane filtration of the first coffee extract to reduce a concentration of low molecular weight components and obtain a filtered coffee extract, the low molecular weight components having a molecular weight less than about 1 kDa;
   drying the filtered coffee extract to form a dried coffee powder; and
   storing the dried coffee powder in a jar, the instant coffee product comprising the jar and the dried coffee powder stored in the jar.

16. The process of claim 15, wherein the performing of the membrane filtration comprises filtering the first coffee extract using a selectively-permeable membrane to reduce the concentration of the low molecular weight components, wherein the low molecular weight components comprise low molecular weight coffee solids that pass through the selectively-permeable membrane to form a permeate, and wherein high molecular weight coffee solids that are retained by the selectively-permeable membrane form a retentate; and
   wherein the drying of the filtered coffee extract comprises drying the retentate.

17. The process of claim 16, wherein the selectively-permeable membrane is selectively permeable to the components having molecular weight less than 1 kDa in the first coffee extract.

18. The process of claim 15, wherein the dried coffee powder comprises a ratio of a concentration of high molecular weight components to the concentration of low molecular weight components, as defined by size exclusion chromatography (SEC), of at least 5, the high molecular weight components having a molecular weight greater than about 1 kDa.

19. The process of claim 15, further comprising:
   extracting coffee aroma from the roasted and ground coffee beans prior to the extracting of the coffee solids from the roasted and ground coffee beans; and
   subsequently blending the coffee aroma with the filtered coffee extract prior to the drying of the filtered coffee extract.

20. The process of claim 15, further comprising concentrating the filtered coffee extract prior to the drying of the filtered coffee extract.

* * * * *